(12) United States Patent
Bugenhagen

(10) Patent No.: US 8,010,101 B2
(45) Date of Patent: Aug. 30, 2011

(54) SYSTEM AND METHOD FOR DIAGNOSING RF ATTRIBUTES OVER AN RF FOOTPRINT OF A WIRELESS NETWORK

(75) Inventor: Michael K. Bugenhagen, Olathe, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 1255 days.

(21) Appl. No.: 11/642,428

(22) Filed: Dec. 19, 2006

(65) Prior Publication Data
US 2008/0146161 A1   Jun. 19, 2008

(51) Int. Cl.
*H04W 24/00* (2009.01)
(52) U.S. Cl. ........ 455/423; 455/424; 455/422.1; 370/241; 379/1.01
(58) Field of Classification Search .......... 455/423–425, 455/67.11–67.7; 370/241; 379/1.01
See application file for complete search history.

(56) References Cited

U.S. PATENT DOCUMENTS

| | | | | |
|---|---|---|---|---|
| 5,818,385 A * | 10/1998 | Bartholomew | | 342/372 |
| 6,374,079 B1 * | 4/2002 | Hsu | | 455/11.1 |
| 6,675,009 B1 * | 1/2004 | Cook | | 455/420 |
| 2003/0189907 A1 * | 10/2003 | Miyamoto et al. | | 370/320 |
| 2004/0192214 A1 * | 9/2004 | Tanaka et al. | | 455/67.11 |
| 2005/0096080 A1 * | 5/2005 | Choi et al. | | 455/522 |
| 2006/0217116 A1 * | 9/2006 | Cassett et al. | | 455/423 |

* cited by examiner

*Primary Examiner* — Kamran Afshar
*Assistant Examiner* — Kathy Wang-Hurst
(74) *Attorney, Agent, or Firm* — SNR Denton US LLP

(57) ABSTRACT

A system and method for diagnosing RF attributes of signals communicated over a communication footprint including at least one base station configured to provide wireless communications to subscribers of a wireless carrier. Antennas may be fixedly positioned throughout a communications footprint of the base station(s), where the antennas are configured to receive signals from base station(s). At least one receiver may be in communication with the antennas configured to receive the signals from the base station(s) via the antennas. A computer system may be in communication with the receiver(s), where the computing system may be configured to receive RF attributes of signals received at respective antennas and measured by the receiver(s). A data repository may be in communication with the computing system and be configured to store data associated with each of the antennas and representative of RF attributes of the signals received by respective antennas.

26 Claims, 4 Drawing Sheets

SYSTEM AND METHOD FOR DIAGNOSING RF ATTRIBUTES OVER AN RF FOOTPRINT OF A WIRELESS NETWORK

BACKGROUND OF THE INVENTION

Wireless networks have radio frequency (RF) footprints that provide connectivity by a carrier signal connecting remote wireless devices to a network. The ability for a wireless device to connect and remain connected to the network depends upon the signal strength of each carrier frequency. The signal strength of a carrier signal, in part, provides for a signal-to-noise ratio (SNR). In general, higher signal strength means a higher the signal-to-noise ratio. Higher signal-to-noise ratio means better connectivity for wireless devices within the network.

A wireless carrier of a wireless network seeks to improve connectivity to ensure that subscribers have good communications service. Therefore, it is in the best interest of the wireless carrier to maintain high signal strength. However, a problem that exists for the wireless carrier is tuning the wireless network because turning up signal strength to expand the RF footprint of a cell tower or provide better connectivity within the cell may actually degrade signal-to-noise ratio of the network due to the higher signal strength of one carrier frequency expanding into another carrier frequency or extending into surrounding tower footprints.

To combat the tuning problem, most wireless carriers employ personnel and trucks to drive around the RF footprint and map the signal-to-noise ratio. Measuring the signal-to-noise ratio around the RF footprint enables the wireless carrier to tune antenna transmission power to optimize the network. However, this exercise is expensive as it takes a lot of time and man-hours to record and correlate the signal-to-noise ratio data around the network. Data gathered by a mobile system also lacks the ability to record RF attributes during the same time frame. As a result, not recording RF attributes during the same time frame introduces added error to sampling given power level changes over time. As understood in the art, signal-to-noise ratio changes for a variety of reasons, including other carriers re-tuning their network, demand changes, and buildings being constructed. Because of the constantly changing signal-to-noise ratios, the wireless carrier must constantly tune the network. However, due to the size of a wireless network, the ability to tune the network using conventional mobile measurement techniques is slow.

SUMMARY

To overcome the problems of tuning a wireless network the principles of the present invention provide for fixed location receiver systems that may include antennas, programmable receivers, configurable RF tuners, and demodulation units. The fixed location receiver systems may be positioned within a communications footprint of the wireless network and be used for measuring signal strength, noise levels, and other RF attributes of carrier signals being received at the antennas. Each antenna may be designated by coordinates (e.g., latitude and longitude) and RF attributes, such as signal strength and/or signal-to-noise ratio of a signal received by each antenna may be determined. The receiver systems may be configured for specific modulation and frequency types, such as CDMA, WiMax, GSM, TDMA, AM, FM, TV signals, VHF or any other type of wireless communication signal. In addition, the receiver systems may perform frequency sweeps to record an RF environment or target specific carrier and modulation schemes to determine the overall signal quality for that wireless transmission network. The signal strength and/or signal-to-noise ratio may be stored and displayed on a map to enable someone to tune the network by increasing and/or decreasing power of carrier signals. Because the antennas are in a fixed position, measurements may be performed substantially simultaneously, more frequently, and during multiple hourly intervals at those locations than using a mobile measurement system.

One embodiment for diagnosing signal strength over a communication footprint may include a system including antennas fixedly positioned throughout a communications footprint, where the antennas are configured to receive signals. The signals may be carrier signals that are being demodulated to analyze signal strength or sampling environmental noise levels. At least one receiver may be in communication with the antennas configured to receive the signals via the antennas. A computer system may be in communication with the receiver(s), where the computing system may be configured to receive RF attributes, such as noise level, or signal strength data indicative of signal strengths of signals received at respective antennas and measured by the receiver(s). A data repository may be in communication with the computing system and be configured to store data associated with each of the antennas and representative of signal strengths of the signals received by respective antennas. In addition, the computing system may remotely configure a tunable receiver/demodulator and allow them to target a specific wireless signal or step through an RF spectrum to measure and collect RF attributes within that RF spectrum.

Another embodiment for diagnosing signal strength may include a process for diagnosing signal strength over a communication footprint of a wireless network. The process may include receiving signals communicated from a wireless network at fixed locations throughout at least a portion of a communications footprint of a wireless network RF attributes, such as signal strengths, of the received signals may be measured and data representative of signal strengths of the received signals may be stored in association with coordinates of the fixed locations.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
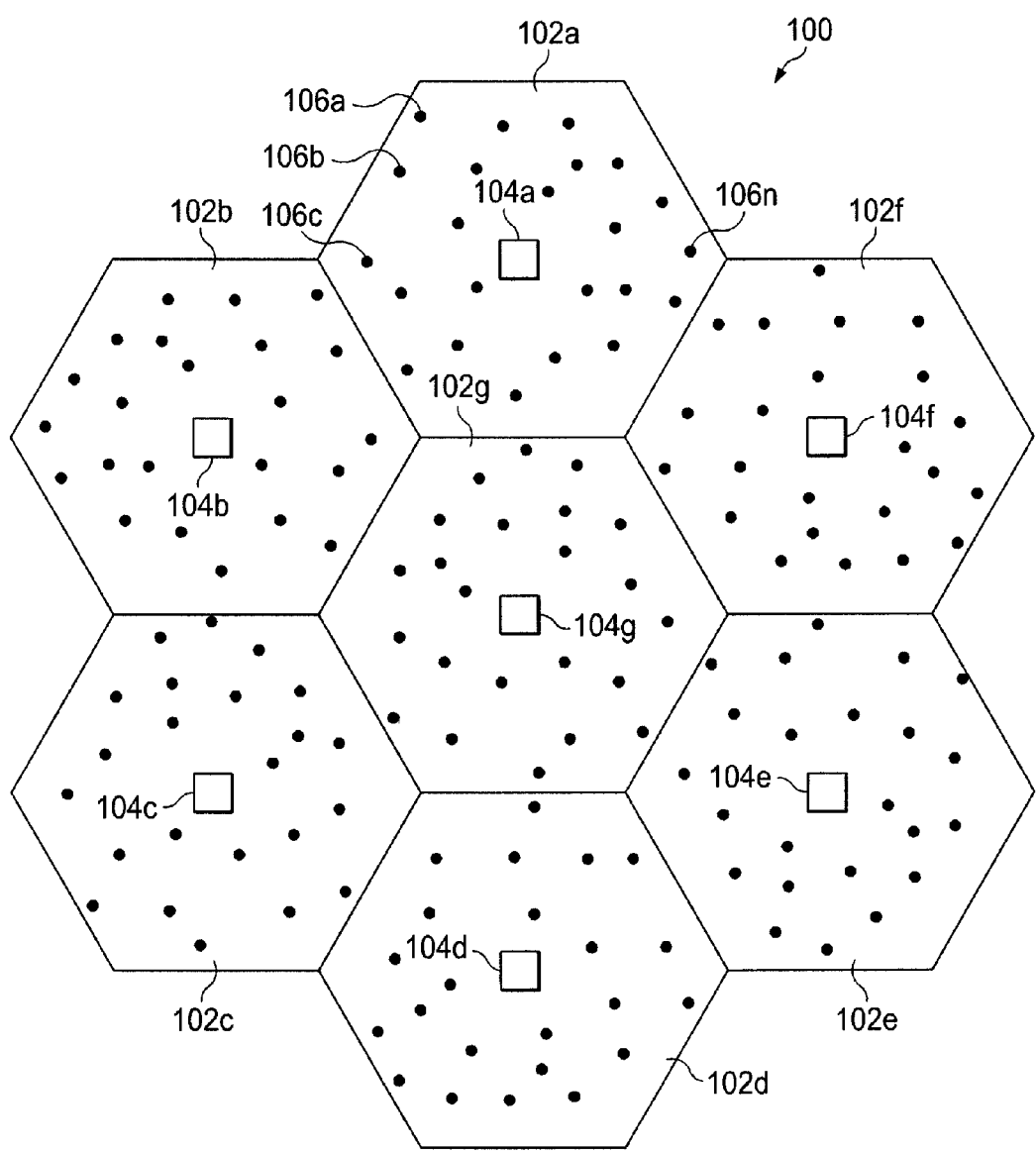
FIG. 1 is an illustration of an exemplary geographic region having a cellular network with an RF footprint over which a telecommunications carrier services customers, the RF footprint includes fixed location antennas to measure RF attributes of signals, where the RF attributes may include signal strengths, signal noise floor, and other attributes of RF signals, as understood in the art.

FIG. 1 is an illustration of an exemplary geographic region having a cellular network 100 with an RF footprint over which a telecommunications carrier services customers, the RF footprint includes fixed location antennas to measure RF attributes of signals, where the RF attributes provide character of RF signals in a frequency area. The RF attributes may include signal strengths, signal noise, and other attributes of RF signals, as understood in the art. The cellular network 100 may include a number of cells 102a-102g (collectively 102) that are defined by a base station 104a-104g (collectively 104) located within respective cells 102. It should be understood that although the cells are shown as distinct hexagons, the RF signal of the base stations may extend into the RF footprint of other cells. When the RF signal of one cell extends into the RF footprint of another cell RF noise results in the other cell, thereby affecting connectivity of wireless devices operating in the other cell.

In accordance with the principles of the present invention, fixed location receiver system 106a-106n (collectively 106) are disposed within cell 102a. These fixed location receiver systems 106 are dispersed throughout the RF footprint of the cell 102a and are used to measure RF signals generated by the base station 104a. The fixed location receiver systems 106 are located at known locations having known coordinates. The coordinates may be defined by latitude and longitude or any other coordinate system that enables a telecommunications carrier to view measurement information associated with the fixed location receiver systems 106 and know where that location is with respect to features on a map, for example. To reduce costs for deploying the fixed location receiver systems 106, the systems 106 may be installed during installation of wireless local area networks.

Figure 2:
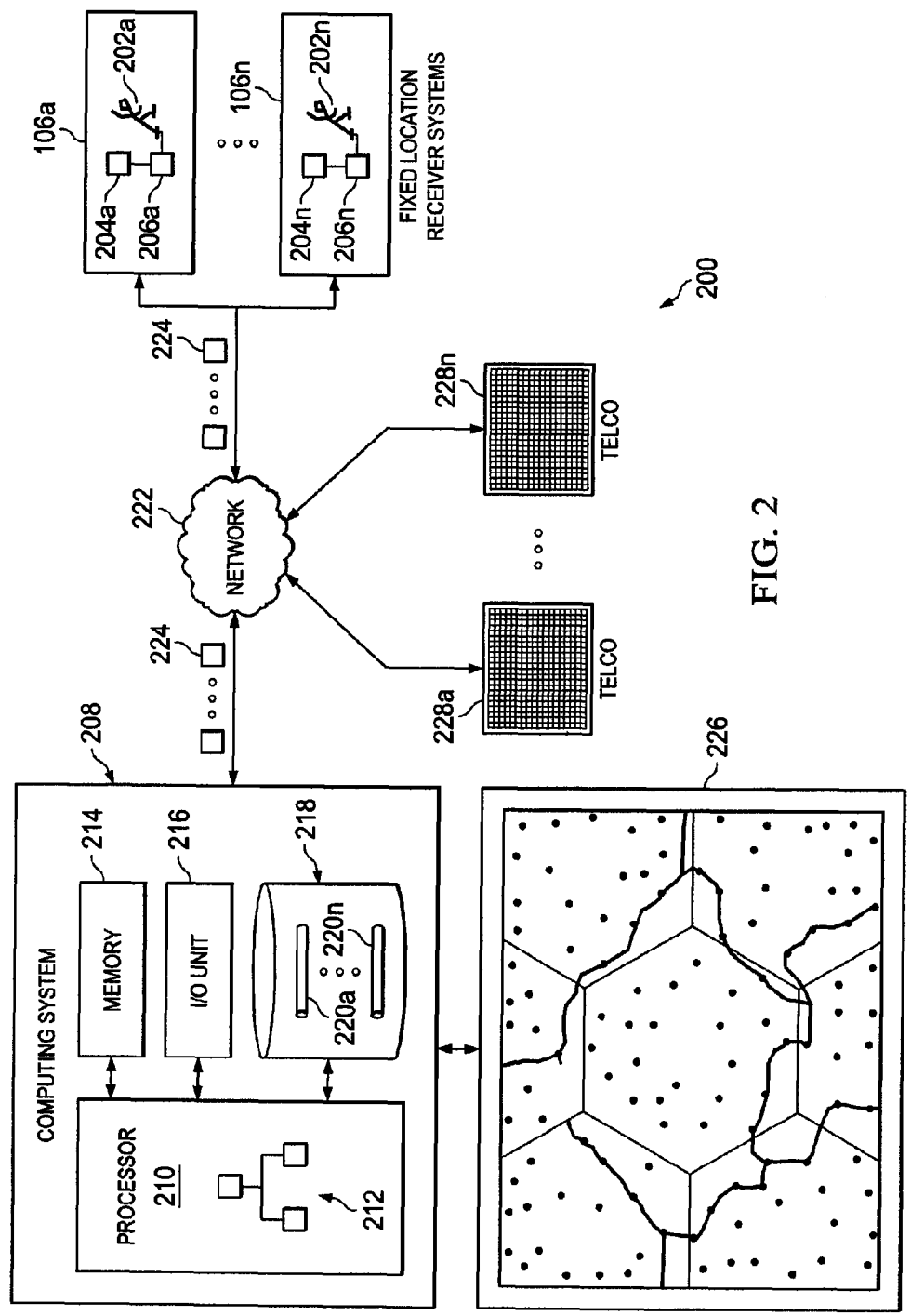
FIG. 2 is an illustration of an exemplary system for collecting RF attributes of signals, including signal strength and noise floor measurements, within the RF footprint of the telecommunications carrier and providing other carriers the measurement information.

FIG. 2 is an illustration of an exemplary system 200 for collecting RF attributes of signals, including signal strength and noise floor measurements, within the RF footprint of the telecommunications carrier and providing other carriers the measurement information. In performing the signal strength and noise floor measurements within the RF footprint of the telecommunications carrier, maps (see, for example, FIG. 3) may be generated to show signal strength, noise floor, and/or signal-to-noise ratio measurements on a map in association with the coordinates of the fixed location receiver systems 106.

The fixed location receiver systems 106 may simply be an antenna 202a-202n (collectively 202) fixedly positioned (i.e., not mounted to a vehicle). Alternatively, each or a portion of the fixed location receiver systems 106 may include receivers 204a-204n (collectively 204) and processing units 206a-206n (collectively 206) for receiving and processing RF signals and/or noise floor samples. Alternatively, a single receiver and processing unit may be configured to communicate with multiple antennas and perform signal measurements for each fixed location. The receivers and/or antennas may include configurable RF tuners and demodulation units, and be tunable so that the fixed location receiver systems 106 may measure carrier signals over the range of carrier frequencies produced by each of the base stations 104. To tune the receivers 204, a control system (not shown) may be included in the receivers 204 or processing units 206 for tuning the receiver to particular carrier frequencies. In addition, the antennas may be directional or omni-directional, as understood in the art.

A computing system 208 that may operate as a server may be configured with a processing unit 210 that executes software 212. The processing unit 210 may be in communication with a memory 214 used to store data and software modules during execution of the software 212, input/output (I/O) unit 216 for communicating with devices external from the computing system 208, and storage unit 218. The storage unit 218 may store data repositories 220a-220n (collectively 220), such as text files or database(s), used to store signal measurement information collected by the fixed location receiver systems 106.

A network 222 may provide a communication medium for the computing system 208 to communicate with the fixed location receiver systems 106. The network 222 may be the Internet or telecommunications network. In communicating over the network 222, data packets 224 may be utilized, as understood in the art. The computing system 208 may communicate commands to the fixed location receiver systems 106 to cause the fixed location receiver systems 106 to take one or more measurements and communicate the measurements back to the computing system 208 for storage in a data repository 220a. Alternatively, the fixed location receiver systems 106 may be configured to automatically take signal and noise floor measurements at predetermined times or intervals.

The computing system 208 may further communicate commands to the fixed location receiver systems 106 to set the receiver frequency and modulation scheme to perform carrier quality analysis and spectral frequency analysis. The software 212 may be configured to process the measured signals and noise floor. In one embodiment, the software 212 may determine signal-to-noise ratios from the measured signals. The software 212 may further be configured to manage the data repositories 220, including information associated with the fixed location receiver systems 106 and measurements made thereby. For example, the fixed location receiver system information may include location, equipment type, date installed, etc., and measurement information may include signal strength and noise floor measurements. Multiple data sets for each sector of an antenna can be gathered and stored as well.

TABLE I is an exemplary table of information that may be stored in the data repositories 220. As shown, the table may include customer serving area (CSA) of the fixed location receiving systems 106, latitude, longitude, measurement date, measurement time, frequency, signal, and noise. The information stored in the data repositories 220 may include measurements over multiple times of a day and data over long periods of time for historical purposes. Still yet, computations made by the software 212, such as signal-to-noise ratio, may be stored in the table. It should be understood that any information that may be useful for a telecommunications carrier to tune a wireless network may be stored and utilized by the telecommunications carrier. Tuning of the wireless network may be performed over certain times of the day based on communication traffic, noise sources, or other reasons that affect communications. Alternatively, the wireless network may be tuned once in a predetermined time period (e.g., weekly, daily, or hourly). Still yet, continuous or intermittent tuning may be performed. In one embodiment, tuning may be performed in response to an event (e.g., carrier signal dropping below a threshold). Still yet, the receiver may be swept or stepped over a frequency band to collect RF attributes over the entire band or a portion thereof.

In terms of the telecommunications carrier using the information, the software may be configured to have upper and lower signal strength thresholds that are used to monitor signal strengths measured by the fixed location receiver systems 106. If a signal strength measurement is above an upper threshold, it is indicative that a base station 104a (FIG. 1) is outputting a frequency signal that is too high and may degrade signal-to-noise ratios in adjacent cells 102b, 102f, and 102g, for example. In response to determining that the signal strength measured is above the upper threshold, then an alert (e.g., email, notification, light, message, or other alert) may be generated by the software to notify a system manager to adjust the output power of the base station. The thresholds may be different for different carrier frequencies and for different locations (e.g., rural versus urban areas). Similarly, if a signal strength measurement is below a lower signal strength threshold, then an alert may be generated to notify a system manager to increase the power of the measured carrier signal. In one embodiment, an automated control system that is part of the software 212 or independent of the computing system 208 may be utilized to automatically adjust the power of the carrier signals.

tune their communications system more frequently. In one embodiment, the other telecommunications carriers may pay money to access the measurement data.

Figure 3:
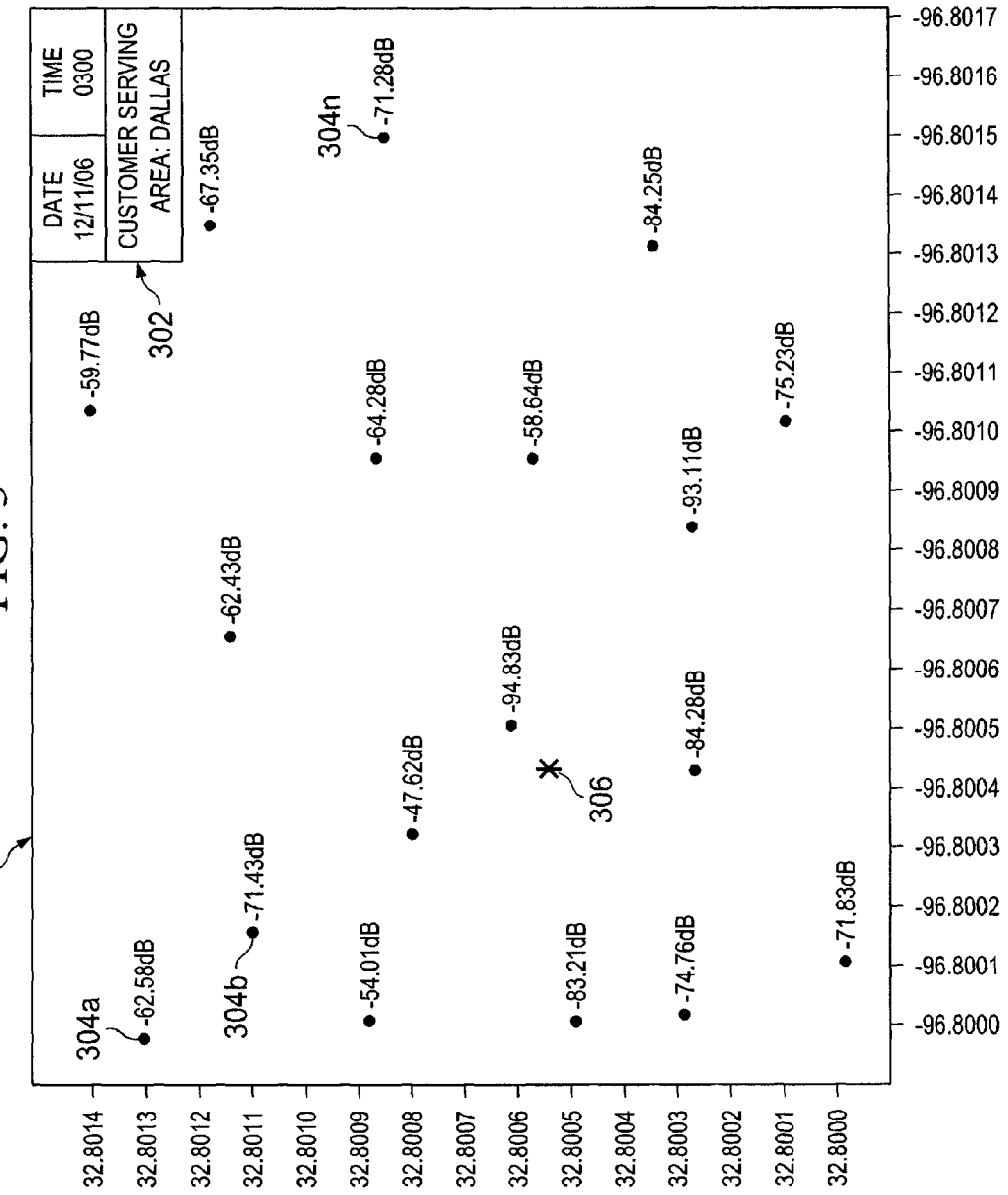
FIG. 3 is an illustration of an exemplary map 300 of RF attributes, such as signal strength measurements, over a selected region of an RF footprint of a telecommunications carrier.

FIG. 3 is an illustration of an exemplary map 300 of RF attributes, such as signal strength measurements, over a selected region of an RF footprint of a telecommunications carrier. The map 300 may include an information region 302 that may include relevant information about the measurements being shown, including date, time, and customer serving area. In the example shown, the measurement date was Dec. 11, 2006 and time of the measurements was 0300 (i.e., 3:00 AM. The customer serving area was Dallas and the region was over latitude coordinates between 32.8000 and 32.8014 and longitudinal coordinates between −96.8000 and −96.8017. Each of the fixed location receiving systems 304a-304n (collectively 304) have a signal strength (e.g., −62.58 dB) associated therewith. Although not shown, the specific coordinates of the fixed location receiving systems 304 may be displayed in associated therewith. Still yet, noise floor measurements (not shown) may also be displayed in association with the fixed location receiving systems 304. In one embodiment, the coordinate information, signal strength

TABLE I

Exemplary Receiver and Measurement Table

| CSA | Rec. ID | Lat. | Long. | Date | Time | Freq. (MHz) | Sig. (dB) | Noise (dB) |
|---|---|---|---|---|---|---|---|---|
| Dallas | 7234J | 32.80028 | −96.80001 | Dec. 11, 2006 | 0300 | 837.05 | −74.76 | −97.23 |
| Dallas | 7234K | 32.80048 | −96.8000 | Dec. 11, 2006 | 0300 | 837.05 | −83.21 | −97.78 |
| Dallas | 7234L | 32.80087 | −96.80002 | Dec. 11, 2006 | 0300 | 837.05 | −54.01 | −98.29 |

In addition, the software 212 may be configured to perform a triangulation analysis on the measured signal strength data to determine a noise source (e.g., an RF or other frequency signal or structure, such as a building, that is not part of the telecommunications system that interferes with communications within one or more cells). In determining a location of a noise source, the coordinates may be generated and provided to an operator of the computing system 208 in an alert message or graphically on a map. Applications, such as determining a location of an illegal transmission within a certain frequency range, such as AM, FM, television, etc., may be helpful to service providers and the Federal Communications Commission (FCC). In determining a noise source, if it is determined that the noise source is an illegal transmission, the software 212 may report the illegal noise source to the proper authorities.

The software 212 may also generate a map 226 of an RF footprint that includes fixed location receiver systems. The map may show indicia of locations, including streets, names, houses, buildings, natural formations (e.g., hills and streams), etc., and show coordinates associated with each of the fixed location receiver systems. In addition, the map 226 may also show cell boundaries. Still yet, the software 212 may enable other telecommunication carriers 228a-228n to access the measured signal strength and noise data to generate a map on a graphical user interface (e.g., webpage) so that they may tune their own telecommunications system in the same or similar manner. To access the webpage, a subscriber to the webpage (e.g., telecommunications carrier) may enter login information, such as user ID and password. By enabling other telecommunications carriers to access the measurement data collected from the fixed location receiving systems 106, the other carriers may slow down or stop the use of mobile measurement system, thereby saving money and being able to measurement, noise floor measurement, signal to noise measurement, and other relevant information (e.g., receiver ID) may be displayed in a pop-up window in response to a user moving a pointer controlled by a computer mouse or otherwise over a particular fixed location receiving system indicia (e.g., 304a). Other coordinates or views of the map 300 may be selectively displayed by using scroll bars, soft-buttons, pop-up window text input fields, and other software controls, as understood in the art. Indicia 306 representative of a potential noise source identified by using a triangulation algorithm may be displayed on the map 300 to enable a telecommunications carrier to determine the physical location of the potential noise source within the system. As shown, the fixed location receiving systems local to the noise source have low signal strengths, which may be indicative of a noise source in the local area.

Figure 4:
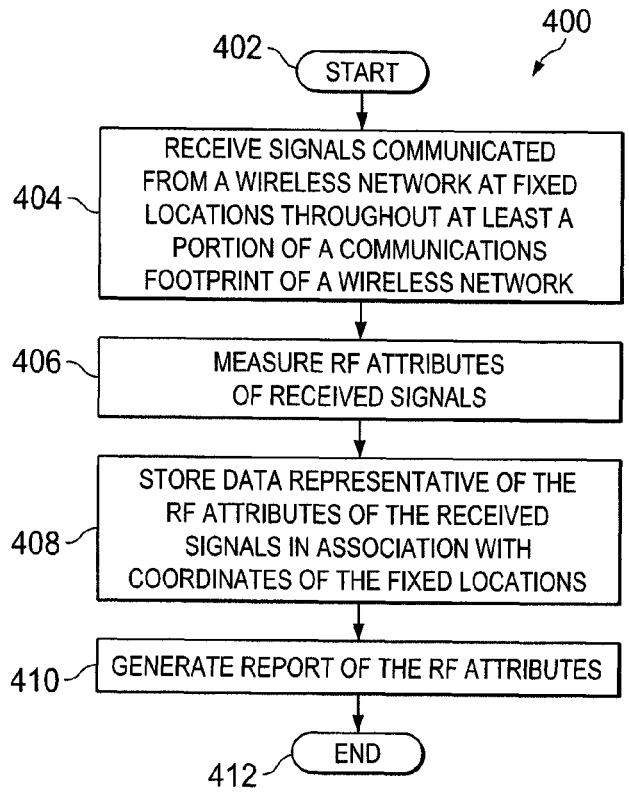
FIG. 4 is a flow diagram of an exemplary process for measuring signal strengths at fixed locations over an RF footprint of a telecommunications carrier.

FIG. 4 is a flow diagram of an exemplary process 400 for measuring signal strengths at fixed locations over an RF footprint of a telecommunications carrier. The process 400 starts at step 402. At step 404, signals communicated from a wireless network are received at fixed locations throughout at least a portion of a communications footprint of a wireless network RF attributes, such as signal strengths, of the received signals are measured at step 406. At step 408, data representative of RF attributes of the received signals are stored in association with coordinates of the fixed locations. In addition to storing the RF attributes measurements, including signal strengths, noise floor measurements may also be measured and stored. At step 410, a report of the RF attributes may be generated. The report may include generating a map, table, or other format with the RF attributes. The report may be utilized by the telecommunications carrier to adjust power of carrier signals being broadcast from base stations within the RF footprint. The process ends at step 412.

Figure 5:
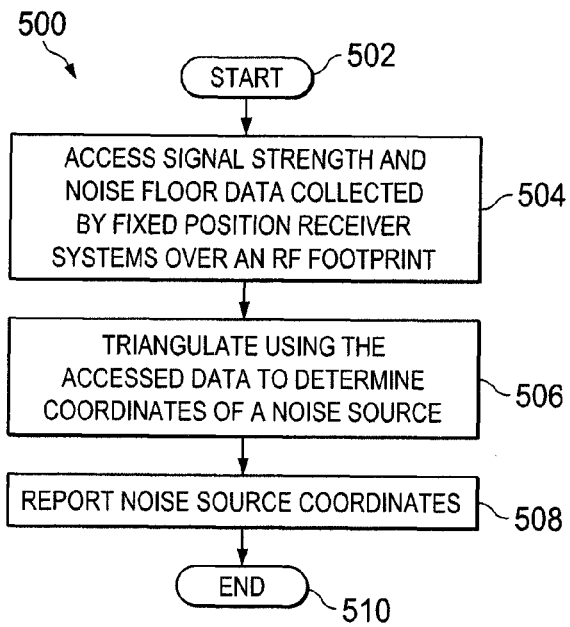
FIG. 5 is a flow diagram of an exemplary process for determining location of a noise source within an RF footprint of a telecommunications carrier.

FIG. 5 is a flow diagram of an exemplary process 500 for determining location of a noise source within an RF footprint of a telecommunications carrier. The process 500 starts at step 502. At step 504, signal strength and noise floor data collected by fixed position receiver systems over an RF footprint are accessed. In one embodiment, the data is accessed from a data repository. At step 506, the accessed data is used for triangulation to determine coordinates of a noise source. The noise source coordinates are reported at step 508 and the process ends at step 510.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A system for diagnosing RF attributes of signals communicated over a communication footprint of a wireless network, said system comprising:
   a plurality of antennas fixedly positioned throughout a communications footprint, said antennas configured to receive signals for diagnosing RF attributes within the communications footprint of the wireless network;
   at least one receiver fixedly positioned in the wireless network in communication with said antennas configured to receive the signals from at least one base station via said antennas;
   a computer system in communication with said at least one receiver, said computing system configured to receive RF attribute data indicative of signals received at respective antennas and measured by said at least one receiver;
   a data repository in communication with said computing system and configured to store data associated with each of said antennas and representative of RF attributes of the signals received by respective antennas, wherein said data repository is further configured to store coordinates of said fixed antennas; and
   wherein said computing system is further configured to provide other telecommunication carriers access to the RF attribute data stored in the data repository, enabling the other telecommunication carriers to tune their telecommunications system based on the accessed RF attribute data.

2. The system according to claim 1, wherein at least a portion of said antennas are positioned in relation to wireless local area networks.

3. The system according to claim 1, wherein said computing system is further configured to generate a map with RF attributes of the signals received by respective antennas displayed thereon at coordinates of said antennas.

4. The system according to claim 1, wherein said computing system is further configured to generate an alert if an RF attribute received by an antenna drops below a threshold level.

5. The system according to claim 1, wherein said computing system is further configured to generate an alert if an RF attribute received by an antenna exceeds a threshold level.

6. The system according to claim 1, wherein said computing system is further configured to generate a graphical user interface for display of the RF attributes over a network.

7. The system according to claim 6, wherein said computing system is further configured to verify login information of a user utilizing the graphical user information prior to enabling the user to access the stored signal strengths.

8. The system according to claim 1, wherein said computing system is configured to update the RF attribute data representative of the received signals.

9. The system according to claim 8, wherein said computing system is configured to update the RF attributed data representative of the received signals received by each antenna at least once per week.

10. The system according to claim 1, wherein said computing system is configured to cause power of the signals to be changed based on at least one RF attribute of the signals received by at least a portion of said antennas.

11. The system according to claim 1, wherein said computing system is further configured to locate a noise source within the communication footprint by using a triangulation algorithm based on at least one RF attribute of the signals received by at least a portion of said antennas.

12. The system according to claim 1, wherein said receiver includes a frequency tuner to change the frequency of the receiver.

13. The system according to claim 1, wherein the RF attributes includes signal strength.

14. A method for diagnosing RF attributes of signals communicated over a communication footprint of a wireless network, said method comprising:
   receiving signals communicated from a plurality of antennas in the wireless network at fixed locations throughout at least a portion of the communications footprint of the wireless network;
   communicating with the said antennas from the at least one receiver fixedly located in the wireless network;
   measuring the received signals by the at least one receiver for diagnosing at least one RF attribute; and
   storing data representative of diagnosing the at least one RF attribute of the received signals in association with the said antennas in a data repository, and storing associated coordinates of the fixed locations of the said antennas in the data repository; and
   providing other telecommunication carriers access to the data representative of diagnosing the at least one RF attribute stored in the data repository, wherein the accessed data enables the other telecommunication carriers to tune their telecommunications system.

15. The method according to claim 14, further comprising positioning antennas at the fixed locations.

16. The method according to claim 15, wherein positioning the antennas including positioning at least a portion of the antennas in association with wireless local area networks.

17. The method according to claim 14, further comprising generating a map with the at least one RF attribute displayed thereon at coordinates of the fixed locations.

18. The method according to claim 14, further comprising generating an alert if at least one RF attribute received at a power fixed location drops below a threshold level.

19. The method according to claim 14, further comprising generating an alert if at least one RF attribute exceeds a threshold level.

20. The method according to claim 14, further comprising generating a graphical user interface for displaying the at least on RF attribute over a network.

21. The method according to claim 20, further comprising verifying login information from a user utilizing the graphical user interface prior to enabling the user to access the stored at least one RF attribute.

22. The method according to claim 14, further comprising updating the data representative of the at least one RF attribute.

23. The method according to claim 22, wherein updating the data representative of the at least one RF attribute is performed at least once per week.

24. The method according to claim 14, further comprising changing power of the signals being communicated from the wireless network based on the at least one RF attribute of the received signals.

25. The method according to claim 14, further comprising locating a noise source within the communications footprint by using a triangulation algorithm based on the at least one RF attribute with at least a portion of the signals received at the fixed locations.

26. The method according to claim 14, further comprising selectively receiving a particular carrier frequency for measurement.

* * * * *